United States Patent
Enomoto

(10) Patent No.: US 7,894,363 B2
(45) Date of Patent: Feb. 22, 2011

(54) DATA TRANSFER RATE VARIANCE MEASUREMENT METHOD, APPARATUS, SYSTEM, AND STORAGE MEDIUM FOR STORING PROGRAM

(75) Inventor: Tadashi Enomoto, Tokyo (JP)

(73) Assignee: NEC Communication Systems, Ltd., Tokyo (JP)

(*) Notice: Subject to any disclaimer, the term of this patent is extended or adjusted under 35 U.S.C. 154(b) by 130 days.

(21) Appl. No.: 12/142,224

(22) Filed: Jun. 19, 2008

(65) Prior Publication Data

US 2008/0316936 A1 Dec. 25, 2008

(30) Foreign Application Priority Data

Jun. 19, 2007 (JP) .............................. 2007-161676

(51) Int. Cl.
*H04L 12/26* (2006.01)
(52) U.S. Cl. ..................................................... 370/252
(58) Field of Classification Search ................. 370/252
See application file for complete search history.

(56) References Cited

U.S. PATENT DOCUMENTS

2003/0048812 A1* 3/2003 Gross .......................... 370/516
2005/0089042 A1* 4/2005 Ruutu et al. ............ 370/395.21

FOREIGN PATENT DOCUMENTS

JP 2006166425 A 6/2006
JP 3834258 B2 7/2006

* cited by examiner

*Primary Examiner*—Huy D Vu
*Assistant Examiner*—Stephen J Clawson

(57) ABSTRACT

A data transfer rate variance indicator having a small amount of calculation for each one packet and a small necessary amount of buffer (memory size), and representing a value suitable for traffic quality evaluation is to be used.

Therefore, a packet transfer time interval is measured, and a data transfer rate variance indicator which is obtained based on a relative entropy value between the measured packet transfer time interval and a packet transfer time interval in a case where transfer is performed at a constant transfer rate is used for calculation.

4 Claims, 4 Drawing Sheets

| TYPES OF TRAFFICS | ON TRAFFIC | | | OFF TRAFFIC | | | INDICATOR | |
|---|---|---|---|---|---|---|---|---|
| | DURATION TIME (ms) | PACKET TIME INTERVAL (ms) | PACKET LENGTH (Byte) | DURATION TIME (ms) | PACKET TIME INTERVAL (ms) | PACKET LENGTH (Byte) | STANDARD DEVIATION/ AVERAGE | VDTR |
| NORMAL | 100000 | 2 | 1100 | 0 | 100 | 1100 | 0.000 | 0.000 |
| ON_OFF | 100 | 2 | 1000 | 100 | 100 | 1000 | 0.133 | 0.244 |
| ON_OFF' | 100 | 2 | 900 | 100 | 2 | 50 | 0.880 | 0.206 |

F I G. 2
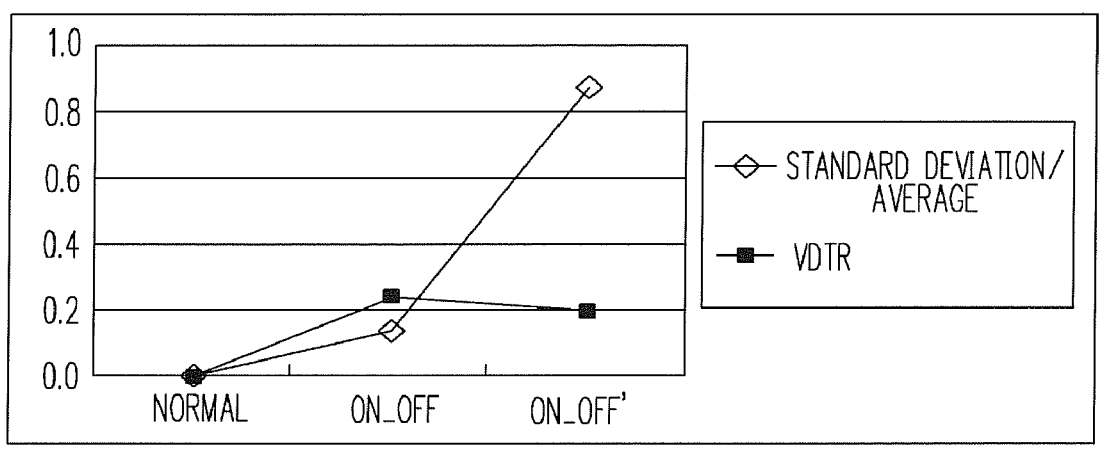

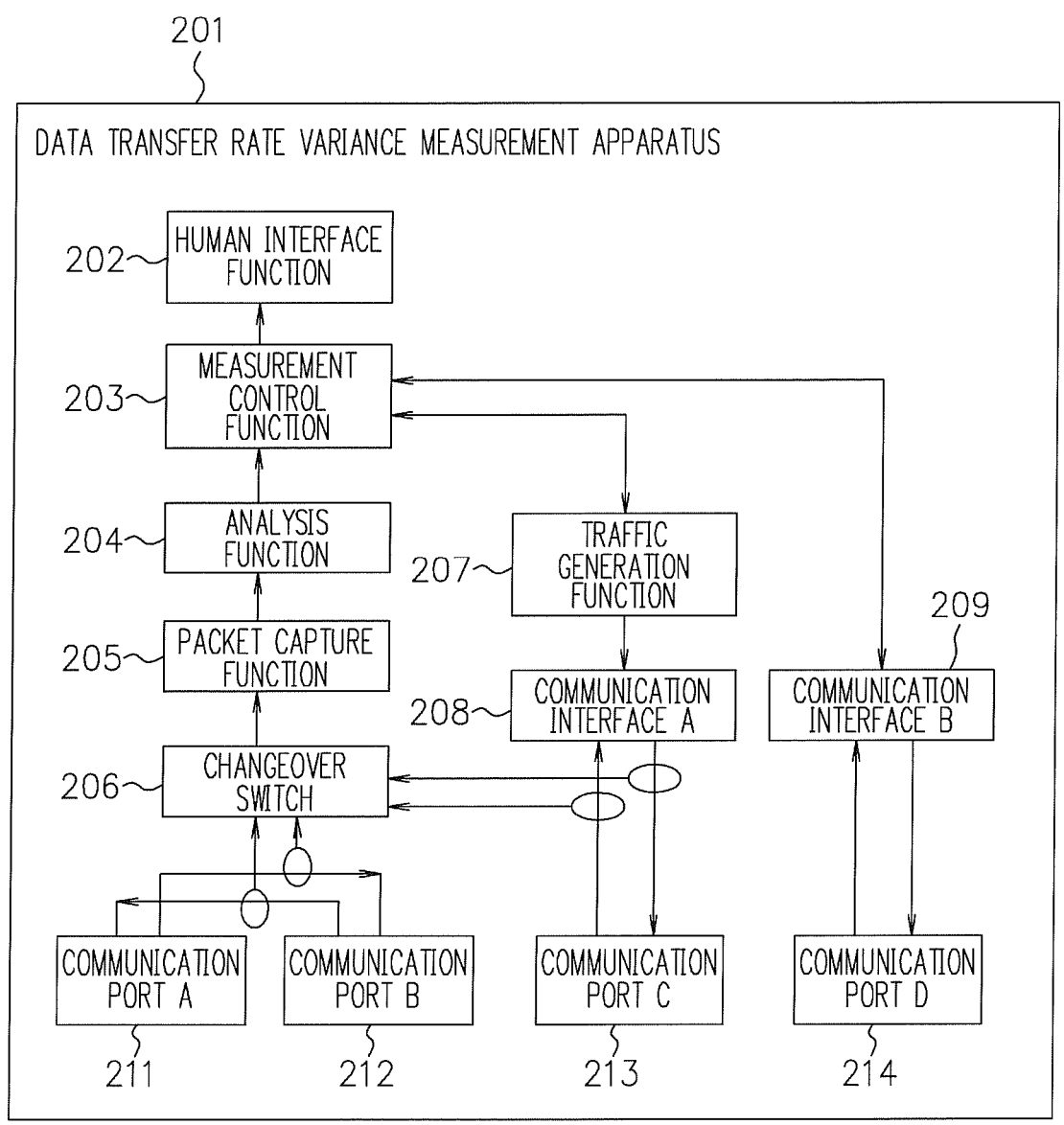

DATA TRANSFER RATE VARIANCE MEASUREMENT METHOD, APPARATUS, SYSTEM, AND STORAGE MEDIUM FOR STORING PROGRAM

This application is based upon and claims the benefit of priority from Japanese patent application No. 2007-161676, filed on Jun. 19, 2007, the disclosure of which is incorporated herein in its entirety by reference.

BACKGROUND OF THE INVENTION

1. Field of the Invention

The present invention relates to data transfer rate variance measurement method, apparatus, system, and storage medium for storing program used for evaluation of quality of a data communication or data transmitting apparatus, or the like.

2. Description of the Related Art

In general, a packet loss ratio or a delay time variance is used as an indicator representing a service quality of a packet data communication network. Particularly, the delay time variance has been considered as an important indicator in transfer of a real-time audio data or video data.

In the transfer of the real-time audio data or video data, data compression is generally performed. In many cases, although an initial rate for generation of real-time audio data or video data is constant, an output data rate at a compressor may be greatly varied as a result of the data compression process. In comparison with a traffic having a substantially constant data transfer rate, a traffic having a greatly-varying data transfer rate has an increasing packet loss and an increasing delay time variance although an average data transfer rate is equal.

Accordingly, in case of transferring the real-time audio data or video data, it is important to reduce the variance of the output data transfer rate at a transmitting apparatus for transmitting the real-time audio data or video data in addition to the improvement of service quality of the packet data communication network.

In addition, as a indicator of the service quality of the packet data communication network, a degree of an increase in the variance of the data transfer rate is important in a case where a packet transmitted from a data transmitting apparatus having a small variance of the output data transfer rate arrives at a receiving apparatus.

Therefore, it is important to perform measurement of output data transfer rate variance at the data transmission apparatus, for example, a server, and measurement of change in the data transfer rate variance in case of packets transmitted via a network.

In addition, in an apparatus used for measurement of quality of the network, the number of to-be-measured packets needs to be increased, but an amount of calculation for each one packet needs to be decreased. In addition, in the apparatus used for measurement of quality of the network, since various measurements may be independently and simultaneously performed according to classification of numbers representing packet transmitter ID, protocol, and the like and numbers representing receiver ID and the like, and the number of to-be-measured objects is increased, therefore a necessary amount of buffer (memory size) needs to be reduced.

Next, the definition of the data transfer rate in the present specification is described. In general, the data transfer rate represents an average transfer rate for a plurality of packets transferred within a predetermined time interval. However, in the specification, the data transfer rate is defined for each packet. Namely, it is assumed that a plurality of packets are transferred, a packet length of an i-th packet PKT(i) is denoted by $L(i)$, a time point when the i-th packet PKT(i) is transferred is denoted by $t(i)$, and a packet transfer time interval is denoted by $\Delta t(i)=t(i)-t(i-1)$. In this case, the data transfer rate DTR(i) of the i-th packet is defined by the following Equation 1.

$$DTR(i)=L(i)/(t(i)-t(i-1))=L(i)/\Delta t(i) \qquad \text{(Equation 1)}$$

A generally-used data transfer rate is an average data transfer rate of packets PKT(1) to PKT(N) transferred within an arbitrary time interval, which is expressed by the following Equation 2.

$$\text{(Average Data Transfer Rate)}=(\Sigma L(i))/(t(N)-t(0))=(\Sigma L(i))/(\Sigma \Delta t(i)) \qquad \text{(Equation 2)}$$

Here, $\Sigma$ is a symbol representing a summation, and the summation in Equation 2 is performed from i=1 to i=N.

Next, it can be understood from Equation 1 that the variance of the data transfer rate has a close relationship with a variance of a time interval where two packets are transferred. In general, standard deviation or a value obtained by dividing the standard deviation by an average value is used as the indicator representing such a variance of a time interval.

Therefore, although a standard deviation of the data transfer rate expressed by Equation 1 or the value obtained by dividing the standard deviation by an average value may also be used as an indicator representing the data transfer rate variance, the standard deviation and the value obtained by dividing the standard deviation by the average value have not been used.

In addition, as a technology relating the present invention, in a case where a time interval between input packets and output packets and the number of accumulated packets have a normal logarithm probability density distribution, a value of acquisition probability of the number of packets up to a predetermined time point in a transmission queue of a transmission node is obtained by executing a standard normal probability density function $1-\Phi(d)$, determining whether or not the value exceeds a predetermined reference value, evaluating a congestion state if the value is determined to exceed the predetermined reference value (refer to, for example Japanese Patent Application Laid-Open No. 2006-166425).

In addition, as a technology relating the present invention, quality evaluation is performed by calculating a mutual correlation function based on a packet passing time point sequence obtained by probing packets in each measurement apparatus, determining a generation period of a packet or a packet group, extracting a time point sequence within one period, and using a maximum value of correlation values in the time point sequence (refer to, for example, Japanese Patent No. 3834258).

Next, problems of the above-mentioned conventional technologies will be described as follows.

At first, the aforementioned Japanese Patent Application Laid-Open No. 2006-166425 and Japanese Patent No. 3834258 or related technologies have problems in that the data transfer rate variance indicator has not practically been used as a traffic quality indicator or a network service quality indicator.

This is because a data transfer rate variance indicator having a small amount of calculation for each one packet and a small necessary amount of buffer (memory size) and representing a suitable value has not been used.

The method of measuring an average and a standard deviation of a packet transfer time interval $\Delta t(i)$ has problems as follows. In order to measure the average and the standard deviation of the $\Delta t(i)$, the $\Sigma \Delta t(i)$ and the $\Sigma\{\Delta t(i)2\}$ (hereinafter, $(xn)$ denotes an n-power of x) may be measured. Therefore, the indicator satisfies the conditions of a small amount of calculation for each one packet and a small necessary amount of buffer (memory size). However, in a case where the packet length $L(i)$ is not constant, the data transfer rate cannot be estimated from the average and the standard deviation of the $\Delta t(i)$.

Next, the method of measuring an average and a standard deviation of a data transfer rate DTR(i) has problems as follows. In the method of measuring the average and the standard deviation of the data transfer rate DTR(i), there is a problem of non-uniform distribution of the number of the measured samples. Since the measurement times of the DTR (i) is inversely proportional to the packet transfer time interval $\Delta t(i)$, the number of data having a large value of DTR(i) is increased, but the number of data having a small value of DTR(i) is decreased.

Influence of the non-uniform distribution of the number of measured samples can be seen by analyzing the averages and the standard deviations of DTR(i) in the following three types of traffics.

Normal traffic: A packet having a packet length of 1100 bytes is transmitted every 2 ms.

ON_OFF traffic: Two transmission modes, that is, ON and OFF modes are alternately performed every 100 ms. In the ON mode, a packet having a packet length of 1000 bytes is transmitted every 2 ms, and in the OFF mode, any packet is not transmitted.

ON_OFF' traffic: Two transmission modes, that is, ON and OFF' modes are alternately performed every 100 ms. In the ON mode, a packet having a packet length of 900 bytes is transmitted every 2 ms, and in the OFF' mode, a packet having a packet length of 50 bytes is transmitted every 2 ms.

The DTR(i) of the three types of traffics are illustrated in FIG. 1. The horizontal axis denotes a time ms, and the vertical axis denotes Mbps. Values of the average, the standard deviation, and the standard deviation/average of the DTR(i) of the three types of traffics are as follows.

In the normal traffic, the average is 4.40 Mbps, the standard deviation is 0.00 Mbps, and the standard deviation/average is 0.00.

In the.ON_OFF traffic, the average is 3.93 Mbps, the standard deviation is 0.52 Mbps, and the standard deviation/average is 0.13.

In the.ON_OFF' traffic, the average is 1.93 Mbps, the standard deviation is 1.70 Mbps, and the standard deviation/average is 0.88.

It is preferable that, as the value of the indicator of traffic quality evaluation, the value of the ON_OFF traffic and the value of the ON_OFF' traffic are selected to be substantially equal to each other, and the values of the two traffics are selected to be greatly different from the value of the normal traffic.

However, due to the non-uniform distribution of the measured data in the ON_OFF traffic, the value of the standard deviation/average in the ON_OFF traffic approaches the value of the normal traffic but it is greatly different from the value of the standard deviation/average in the ON_OFF' traffic. Therefore, it can be understood that the standard deviation/average is not suitable for the indicator of the traffic quality evaluation.

In order to solve the above-mentioned problems, the present invention provides a data transfer rate variance measurement method, apparatus, system, and a storage medium for storing a program using a data transfer rate variance indicator having a small amount of calculation for each one packet, a small necessary amount of buffer (memory size), and representing a value suitable for traffic quality evaluation.

SUMMARY

According to an exemplary aspect of the present invention, there is provided a data transfer rate variance measurement method, wherein a interval measurement process of measuring a packet transfer time interval is performed, and a data transfer rate variance indicator which is obtained based on a relative entropy value between the measured packet transfer time interval and a packet transfer time interval in a case where transfer is performed at a constant transfer rate is used.

According to another exemplary aspect of the present invention, there is provided a data transfer rate variance measurement apparatus including a interval measurement unit for measuring a packet transfer time interval, wherein a data transfer rate variance indicator which is obtained based on a relative entropy value between the measured packet transfer time interval and a packet transfer time interval in a case where transfer is performed at a constant transfer rate is used for calculation.

According to still another exemplary aspect of the present invention, there is provided a data transfer rate variance measurement system wherein the data transfer rate variance measurement apparatus according to the above-described present invention is disposed at least at a position where the data transfer rate variance measurement apparatus is connected to a data transmitting apparatus via no to-be-measured network and a position where the data transfer rate variance measurement apparatus is connected to the data transmitting apparatus via the network.

According to further still another exemplary aspect of the present invention, there is provided a storage medium for storing a data transfer rate variance measurement program, wherein a interval measurement process for measuring a packet transfer time interval is executed in a computer, and wherein the computer performs a process by using a data transfer rate variance indicator which is obtained based on a relative entropy value between the measured packet transfer time interval and a packet transfer time interval in a case where transfer is performed at a constant transfer rate.

BRIEF DESCRIPTION OF THE DRAWINGS

FIG. 2 is a view illustrating results of calculation when a standard deviation/average method and a data transfer rate variance indicator according to an exemplary embodiment of the present invention are applied to three examples of traffics;

FIG. 4 is a block diagram illustrating an exemplary configuration of a data transfer rate variance measurement apparatus according to an exemplary embodiment of the present invention.

EXEMPLARY EMBODIMENT

Figure 1:
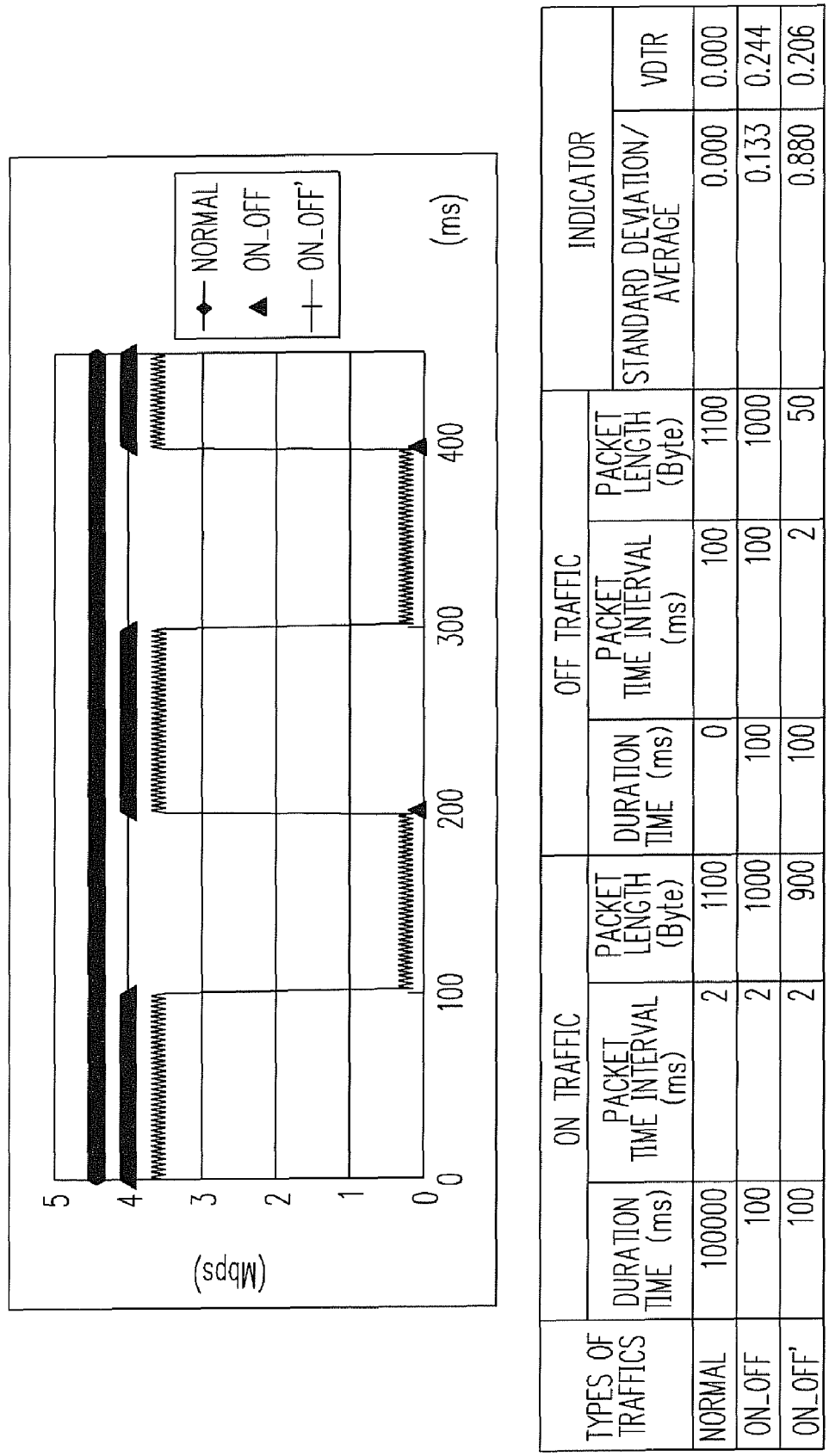
FIG. 1 is a view illustrating time variances of data transfer rates for three examples of traffic.

Hereinafter, a data transfer rate variance measurement method, an apparatus, a system, and a storage medium for storing a program according to exemplary embodiments of the present invention will be described in detail with reference to the accompanying drawings.

Firstly, exemplary embodiments of the present invention will be described in brief.

In a case where transfer of a real-time audio data or video data is performed, it is important that a variance of data transfer rate is small. Therefore, an indicator representing a measurement of a variance of data transfer rate of a data transmitting apparatus is an important value for evaluating the data transmitting apparatus. In addition, an indicator representing a degree of a variance of data transfer rate via a network is an important value for evaluating a network service quality.

However, any data transfer rate variance indicator having a small amount of calculation for each one packet and a small necessary amount of buffer (memory size) and representing a suitable value has not been practically provided as a network service quality indicator.

Accordingly, an apparatus for quantitatively measuring the variance of data transfer rate or a system for measuring the variance of data transfer rate by using the apparatus for quantitatively measuring the variance of data transfer rate have not been practically provided.

The exemplary embodiment of the present invention provide a data transfer rate variance measurement method, a data transfer rate variance measurement apparatus, and an data transfer rate variance measurement system, wherein a packet transfer time interval is measured, wherein the packet transfer time interval/measurement time is considered as a probability distribution, and wherein a degree of data transfer rate variance is represented with a relative entropy value between the probability distribution and a probability distribution of a packet transfer time interval/measurement time in a case where transfer of the same packet is performed at a constant data transfer rate.

In other words, the data transfer rate variance indicator used in the exemplary embodiment of the present invention is obtained as follows. A packet transfer time interval is measured, the packet transfer time interval/measurement time is considered as a probability distribution, and the data transfer rate variance indicator is obtained based on a relative entropy value between the probability distribution and a probability distribution of a packet transfer time interval/measurement time in a case where transfer of the same packet sequence is performed at a constant data transfer rate with no change in the order thereof but a change in the time interval.

Now, the data transfer rate variance indicator (hereinafter, referred to as VDTR (Variance of Data Transfer Rate)) which forms the basis of the system is firstly described. The VDTR is obtained by the following equation.

$$VDTR = \Sigma\{L(i)/(\Sigma L(k))\} * \ln[\{L(i)/(\Sigma L(k))\}/\{\Delta t(i)/(\Sigma \Delta t(k))\}] \quad \text{(Equation 3)}$$

Here, ln( ) denotes a natural logarithm function; and $\Sigma$ denotes a summation of the entire packets in the entire interval from a measurement starting point to a measurement ending point with respect to index i, wherein ($\Sigma L(k)$) and ($\Sigma \Delta t(k)$) are summations of the entire packets in the entire interval from the measurement starting point to the measurement ending point with respect to index k and treated as constants in Equation 3 and the following Equation 4 since the summations do not include the index i.

Equation 3 can be rewritten as follows.

$$\begin{aligned} VDTR &= \Sigma\{L(i)/(\Sigma L(k))\} * [\ln(L(i)) - \ln(\Sigma L(k)) - \\ &\quad \ln(\Delta t(i)) + \ln(\Sigma \Delta t(k))] \\ &= [\Sigma\{L(i)*\ln(L(i))\}/(\Sigma L(k)) - \ln(\Sigma L(k)) - \\ &\quad [\Sigma\{L(i)*\ln(\Delta t(i))\}/(\Sigma L(k)) + \ln(\Sigma \Delta t(k)) \\ &= [\Sigma\{L(i)*\ln(L(i))\}/(\Sigma L(i)) - \ln(\Sigma L(i)) - \\ &\quad [\Sigma\{L(i)*\ln(\Delta t(i))\}/(\Sigma L(i)) + \ln(\Sigma \Delta t(i)). \end{aligned} \quad \text{(Equation 4)}$$

The VDTR is referred to as a relative entropy between two probability distributions $P(i)=L(i)/\Sigma L(k)$ and $Q(i)=\Delta t(i)/\Sigma \Delta t(k)$ or a Kullback-Leibler divergence from Equation 3.

Next, features of the VDTR will be described.

(Feature 1) The VDTR is a relative entropy between P(i) and Q(i), and the relative entropy is generally used as a indicator representing a similarity between probability distributions of P(i) and Q(i). $P(i)=L(i)/\Sigma L(k)$ is a ratio of a packet length L(i) of an i-th packet to a sum of data lengths of all packets, and the P(i) is proportional to $\Delta t(i)$ when the data transfer rate is constant. Namely, the P(i) is a probability distribution of $\Delta t(i)$ when the data transfer rate is constant. Q(i) is a probability distribution of the measured $\Delta t(i)$. Namely, the VDTR is a quantity representing a similarity between a probability distribution of a measured packet transfer time interval and a probability distribution when the data transfer rate is constant.

(Feature 2) The VDTR has a minimum value of 0 when data transfer rates DTR(i) of all packets are equal to an average data transfer rate.

Since the VDTR is a relative entropy between the P(i) and the Q(i), the VDTR has a minimum value if P(i)=Q(i) for all indices i. P(i)=Q(i) for all indices i can be expressed as $L(i)/\Delta t(i)=\Sigma L(k)/(\Sigma \Delta t(k))$. Namely, the data transfer rate DTR(i) of each i-th packet is equal to the average data transfer rate.

It can be understood that when only t(i) among (t(0), t(1), . . . , t(N)) is changed, a partial differentiation $\partial VDTR/\partial t(i)=0$ is solved to be DTR(i)=DTR(i+1).

(Feature 3) The VDTR is a downward convex continuous function.

Meaning of the term "downward convex" is as follows. Sequence data at two packet transfer time points are denoted by $\omega=(s(\mathbf{0}), s(\mathbf{1}), \ldots, s(N))$ and, $\xi=(t(\mathbf{0}), t(\mathbf{1}), \ldots, t(N))$, and values of VDTRs thereof are set to VDTR($\omega$) and VDTR($\xi$). If a sequence data $[\alpha*\omega+(1-\alpha)*\xi]$ at a time point denotes a time sequence at a time point ($\alpha*s(\mathbf{0})+(1-\alpha)*t(\mathbf{0})$, $\alpha*s(\mathbf{1})+(1-\alpha)*t(\mathbf{1}), \ldots, \alpha*s(N)+(1-\alpha)*t(N)$), an sequence data at effective packet transfer time point is $[\alpha*\omega+(1-\alpha)*\xi]$. The VDTR($[\alpha*\omega+(1-\alpha)*\xi]$), that is, a value of VDTR of the time sequence data $[\alpha*\omega+(1-\alpha)*\xi]$ satisfies the following Equation 5. Here, $0<\alpha<1$, and $\omega$ and $\xi$ are not equal to each other.

$$VDTR([\alpha*\omega+(1-\alpha)*\xi]) > \alpha*VDTR(\omega)+(1-\alpha)*VDTR(\xi) \quad \text{(Equation 5)}$$

In addition, it can be understood from the fact that a value of double differentiation of VDTR($[\alpha*\omega+(1-\alpha)*\xi]$) with respect to $\alpha$ is positive.

(Feature 4) The VDTR is expressed by a dimensionless formula, and a value thereof is not changed even though a method of acquiring a unit of L(i) or t(i) is changed.

(Feature 5) In two traffics of which data transfer rate is varied at the same ratio, the values of VDTRs are equal to each other.

For example, the value of VDTR of a traffic of alternately transmitting a packet having a packet length of 500 bytes at a time interval of 10 ms and a time interval of 20 ms, the value of VDTR of a traffic of alternately transmitting a packet having a packet length of 1000 bytes at a time interval of 10 ms and a time interval of 20 ms, and the value of VDTR of a traffic of alternately transmitting a packet having a packet length of 1000 bytes at a time interval of 20 ms and a time interval of 40 ms are equal to each other. In addition, in case of these simple traffics, even though the number of samples is changed, the values of VDTRs are not changed.

(Feature 6) The VDTR have no problem in terms of sampling frequency in comparison with a value of standard deviation/average.

The values of VDTRs for three types of traffics described in the object relating the standard deviation/average are as follows.

In the normal traffic, VDTR=0.00, in the ON_OFF traffic, VDTR=0.24, and in the ON_OFF' traffic, VDTR=0.21. The values of VDTRs of the ON_OFF traffic and the ON_OFF' traffic are substantially equal to each other, and the two values are very different from the value of VDTR of the normal traffic.

FIG. 2 is a view illustrating values of standard deviation/average and VDTR in the normal traffic, the ON_OFF traffic, and the ON_OFF' traffic.

(Feature 7) The VDTR has a small amount of calculation and a small size of memory. The data required for calculation of the VDTR after the measurement is ended are the following four data requiring a small size of memory from Equation 4.

Σ[L(i)*ln(L(i))]
ΣL(i)
Σ[L(i)*ln(Δt(i))]
ΣΔt(i)

In addition, with respect to the amount of calculation, the following three data is required to calculate in each packet transfer.

Σ[L(i)*ln(L(i))]
ΣL(i)
Σ[L(i)*ln(Δt(i))]

Namely, for the ΣΔt(i), an initial packet transfer time t(0) may be maintained.

Although the logarithm functions in the aforementioned data require a relatively large amount of calculation, the amount of calculation can be reduced based on a required figure by using such a technology as "a circuit for generating an approximate value of a logarithm function" disclosed in Japanese Patent Application Publication No. 9-292977.

Next, processes for obtaining the aforementioned Equation 3 will be described.

It is assumed that a packet having a packet length of (L(0), L(1), . . . , L(N)) is transferred at time points (t(0), t(1), . . . , t(N)). The starting time point t(0), the ending time point t(N), and the packet length L(i) are considered as given values, and a function S(t(1), t(2), . . . , t(N−1)) having variables t(1), t(2), . . . , t(N−1) as parameters is considered as a indicator for representing a variance of a data transfer rate.

The function S needs to have an extreme value when the transfer rate is constant. Namely, the arriving time point (t(1), . . . , t(N−1)) need to satisfy that the partial differentiation of the function S with respect to t(i) is 0, that is, ∂S/∂t(i)=0 in case of DTR(i)=C (constant value) and for all indices i of 0<i<N in only the case.

Firstly, an indefinite integration of DTR(i) with respect to t(i), that is, ∫DTR(i)dt(i) is calculated.

∫DTR(i)dt(i)=L(i)*ln(t(i)−t(i−1))+K (K is a constant)

By partially differentiating the ∫DTR(i)dt(i) with respect to the t(i), the DTR(i) is obtained, and by partially differentiating the ∫DTR(i+1)dt(i+1) with respect to the t(i), the −DTR(i+1) is obtained.

Therefore, assuming that

S(t(1), t(2), . . . , t(N−1))=A*[ΣL(i)*ln(t(i))]+B (A and B are constant), the following result is obtained.

$$\frac{\partial S}{\partial t(i)} = A\{\partial[L(i)*\ln(t(i)-t(i-1))]/\partial dt(i) -$$

$$\partial[L(i+1)*\ln(t(i+1)-t(i))]/\partial dt(i)\}$$

$$= A\{DTR(i) - DTR(i+1)\}$$

Accordingly, the ∂S/∂t(i) is 0 in case of DTR(i)=C (constant value) and for all indices i in only the case.

By configuring the constants A and B by using the constants L(i), ΣL(i) (=ΣL(k)), and ΣΔt(i)=t(N)−t(0) (=ΣΔt(k)) so that the function S satisfies Feature 3, Feature 4, and Feature 5, Equation 3 is obtained.

Next, processes for obtaining the aforementioned Equation 4 from Equation 3 are as follows.

$$VDTR = \Sigma\{L(i)/(\Sigma L(k))\} * [\ln(L(i)) - \ln(\Sigma L(k)) - \ln(\Delta t(i)) +$$

$$\ln(\Sigma \Delta t(k))]$$

$$= \{\Sigma\{L(i)*\ln(L(i))/(\Sigma L(k))\} - \Sigma\{L(i)*\ln(\Sigma L(k))/(\Sigma L(k))\} -$$

$$\Sigma\{L(i)*\ln(\Delta t(i))/(\Sigma L(k))\} + \Sigma\{L(i)*\ln(\Sigma \Delta t(k))/(\Sigma L(k))\}$$

$$= \Sigma\{L(i)*\ln(L(i))/(\Sigma L(k))\} - (\Sigma L(i))*\ln(\Sigma L(k))/(\Sigma L(k)) -$$

$$\Sigma\{L(i)*\ln(\Delta t(i))/(\Sigma L(k))\} + \Sigma\{L(i)*\ln(\Sigma \Delta t(k))/(\Sigma L(k))\}$$

$$= [\Sigma\{L(i)*\ln(L(i))\}/(\Sigma L(k)) - \ln(\Sigma L(k)) - [\Sigma\{L(i)*\ln(\Delta t(i))\}/$$

$$(\Sigma L(k)) + \ln(\Sigma \Delta(k))$$

$$= [\Sigma\{L(i)*\ln(L(i))\}/(\Sigma L(i)) - \ln(\Sigma L(i)) - [\Sigma\{L(i)*\ln(\Delta t(i))\}/$$

$$(\Sigma L(i)) + \ln(\Sigma \Delta(i))$$

In calculation of the equation, since the ΣL(k) and the ΣΔ(k) are constant, the ΣL(k) and the ΣΔ (k) can be taken out of the summation. In addition, since the ΣL(i) and ΣL(k), and the ΣΔ (i) and ΣΔ (k) are equal to each other, indices for the summation can be suitably replaced with i and k.

The data transfer rate variance measurement system according to the exemplary embodiment of the present invention is configured by a data transmitting apparatus, a data receiving apparatus, a plurality of data transfer rate variance measurement apparatuses, and a connection for communication between a plurality of data transfer rate variance measurement apparatuses.

The data transfer rate variance measurement apparatus according to the exemplary embodiment of the present invention is configured to include an analysis function using the data transfer rate variance indicator, a measurement control function, a packet capture function, a traffic generation function, a part for performing communication with the plurality of data transfer rate variance measurement apparatuses, a human interface function, and a plurality of communication ports.

Now, a configuration of the exemplary embodiment of the present invention will be described in detail with reference to the accompanying drawings.

Figure 3:
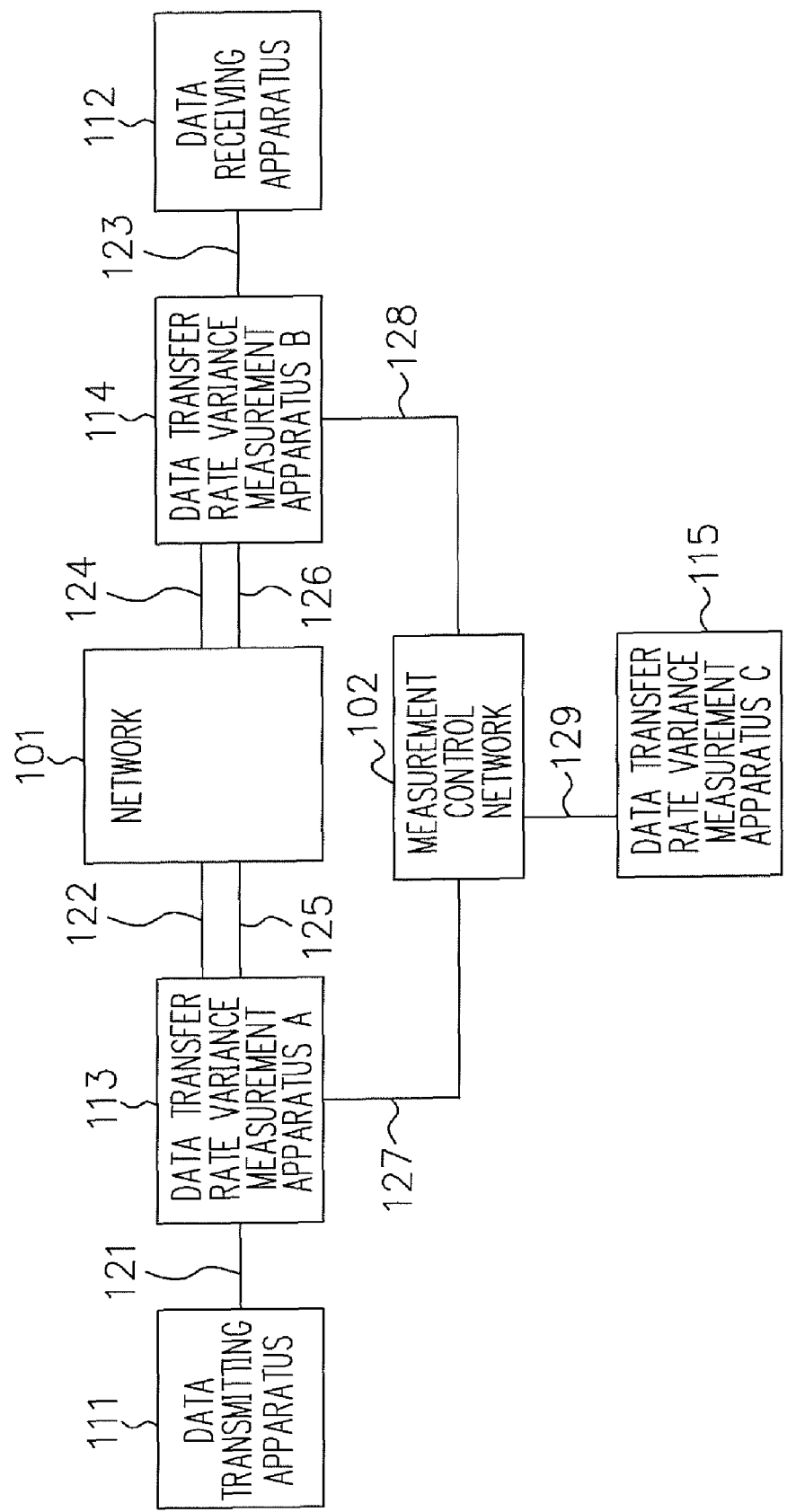
FIG. 3 is a block diagram illustrating an exemplary configuration of a data transfer rate variance measurement system according to an exemplary embodiment of the present invention.

Referring to FIG. 3, the data transfer rate variance measurement system according to the exemplary embodiment includes a network 101, a measurement control network 102, a data transmitting apparatus 111, a data receiving apparatus 112, a data transfer rate variance measurement apparatus A113, a data transfer rate variance measurement apparatus B114, and a data transfer rate variance measurement apparatus C115.

Connections between these apparatuses include a data transmission connection A121 for connection between the data transmitting apparatus 111 and the data transfer rate variance measurement apparatus A113, a data transmission connection B122 for connection between the data transfer rate variance measurement apparatus A113 and the network 101, a data reception connection A123 for connection between the data receiving apparatus 112 and the data transfer rate variance measurement apparatus B114, a data reception connection B124 for connection between the data transfer rate variance measurement apparatus B114 and the network 101, a generation traffic transmission connection 125 for connection between the data transfer rate variance measurement apparatus A113 and the network 101, a generation traffic reception connection 126 for connection between the data transfer rate variance measurement apparatus B114 and the network 101, a data transfer rate variance measurement apparatus inter-connection A127 for connection between the data transfer rate variance measurement apparatus A113 and the measurement control network 102, a data transfer rate variance measurement apparatus inter-connection B128 for connection between the data transfer rate variance measurement apparatus B114 and the measurement control network 102, and a data transfer rate variance measurement apparatus inter-connection C129 for connection between the data transfer rate variance measurement apparatus C115 and the measurement control network 102.

Referring to FIG. 4, the data transfer rate variance measurement apparatus 201 includes a human interface function 202, a measurement control function 203, a analysis function 204, a packet capture function 205, a changeover switch 206, a traffic generation function 207, a communication interface A208, a communication interface B209, a communication port A211, a communication port B212, a communication port C213, and a communication port D214.

The data transmission connection A121 of FIG. 3 is connected to a communication port A of the data transfer rate variance measurement apparatus A113 of FIG. 3, that is, the communication port A211 of FIG. 4. The data transmission connection B122 of FIG. 3 is connected to a communication port B of the data transfer rate variance measurement apparatus A113 of FIG. 3, that is, the communication port B212 of FIG. 4. The data reception connection A123 of FIG. 3 is connected to a communication port A of the data transfer rate variance measurement apparatus A114 of FIG. 3, that is, the communication port A211 of FIG. 4.

The data reception connection B124 of FIG. 3 is connected to a communication port B of the data transfer rate variance measurement apparatus B114 of FIG. 3, that is, the communication port B212 of FIG. 4. The generation traffic transmission connection 125 of FIG. 3 is connected to a communication port C of the data transfer rate variance measurement apparatus A113 of FIG. 3, that is, the communication port C213 of FIG. 4. The generation traffic reception connection 126 of FIG. 3 is connected to a communication port C of the data transfer rate variance measurement apparatus B114 of FIG. 3, that is, the communication port C213 of FIG. 4.

In this manner, in the data transfer rate variance measurement system according to the exemplary embodiment, each of the data transmitting apparatus side and the data receiving apparatus side in the network 101 is provided with the data transfer rate variance measurement apparatus and a control data transfer rate variance measurement apparatus for controlling the data transfer rate variance measurement apparatus of each of the transmitting apparatus side and the receiving apparatus side is also provided.

Namely, the data transfer rate variance measurement apparatus is provided at least to a position (data transfer rate variance measurement apparatus A113) for connection to the data transmitting apparatus 111 via no to-be-measured network 101 and a position (data transfer rate variance measurement apparatus B114) for connection to the data transmitting apparatus 111 via the network 101.

In addition, each of the data transfer rate variance measurement apparatus is connected to each other via the measurement control network 102 and the data transfer rate variance measurement apparatus C (control apparatus) 115 is provided so as to control each data transfer rate variance measurement apparatus through the measurement control network 102.

The data transfer rate variance measurement apparatus inter-connection A127 of FIG. 3 is connected to a communication port D of the data transfer rate variance measurement apparatus A113 of FIG. 3, that is, the communication port D214 of FIG. 4. The data transfer rate variance measurement apparatus inter-connection B128 of FIG. 3 is connected to a communication port D of the data transfer rate variance measurement apparatus B114 of FIG. 3, that is, the communication port D214 of FIG. 4. The data transfer rate variance measurement apparatus inter-connection C128 of FIG. 3 is connected to a communication port D of the data transfer rate variance measurement apparatus C115 of FIG. 3, that is, the communication port D214 of FIG. 4.

Now, whole operations of the exemplary embodiment will be described in detail.

Firstly, the measurement control function of the data transfer rate variance measurement apparatus C115 is controlled through the human interface function of the data transfer rate variance measurement apparatus C115, communication to the measurement control function 203 of the data transfer rate variance measurement apparatus A113 is performed through the communication interface B209 of the data transfer rate variance measurement apparatus C115, the communication port D214 of the data transfer rate variance measurement apparatus C115, the data transfer rate variance measurement apparatus inter-connection C129, the measurement control network 102, the data transfer rate variance measurement apparatus inter-connection A127, the communication port D214 of the data transfer rate variance measurement apparatus A113, and the communication interface B209 of the data transfer rate variance measurement apparatus A113, so that the data transfer rate variance measurement apparatus A113 may be remotely controlled.

Similarly, the data transfer rate variance measurement apparatus B114 may be remotely controlled through the human interface function of the data transfer rate variance measurement apparatus C115.

Next, transmission of a real-time audio data or video data from the data transmitting apparatus 111 to the data receiving apparatus 112 starts. Packets input to the communication port A211 of the data transfer rate variance measurement apparatus 201 are transmitted out from the communication port B212 without any change, and on the contrary, packets input to the communication port B212 of the data transfer rate variance measurement apparatus 201 are transmitted out from the communication port A211 without any change, so that communication can be normally performed.

The changeover switch 206 of the data transfer rate variance measurement apparatus A113 is changed over so that the packet capture function 205 is set to receive the packet transferred from the communication port A211 to the communication port B212, and the analysis function 204 is prepared to measure the data transfer rate variance. Next, the changeover switch 206 of the data transfer rate variance measurement apparatus B114 is changed over so that the packet capture function 205 is set to receive the packet transferred from the communication port B212 to the communication port A211, and the analysis function 204 is prepared to measure the data transfer rate variance.

Finally, the data transfer rate variance measurement apparatus A113 and the data transfer rate variance measurement apparatus B114 are simultaneously controlled, so that starting and ending of the measurement of the data transfer rate variance are performed.

In this manner, a degree of variance of the output data transfer rate at the transmitting apparatus for transmitting the real-time audio data or video data and a degree of variance of the data transfer rate at the receiving apparatus can be measured.

Next, operations of measuring a degree of increase in the variance of the data transfer rate in a case where a normal traffic having a small variance of the output data transfer rate arrives at the receiving apparatus through the network will be described.

Firstly, the changeover switch 206 of the data transfer rate variance measurement apparatus A113 is changed over so that the packet capture function 205 is set to receive the packet output from the communication port C213, and the analysis function 204 is prepared to measure the data transfer rate variance.

In addition, the changeover switch 206 of the data transfer rate variance measurement apparatus B114 is changed over so that the packet capture function 205 is set to receive the packet input from the communication port C211, and the analysis function 204 is prepared to measure the data transfer rate variance.

Next, the traffic generation function 207 of the data transfer rate variance measurement apparatus A113 is controlled so that starting of the output of the normal traffic is instructed. Finally, the data transfer rate variance measurement apparatus A113 and the data transfer rate variance measurement apparatus B114 are simultaneously controlled, so that starting and ending of the measurement of the data transfer rate variance are performed.

In this manner, a degree of increase in the variance of the data transfer rate in a case where the normal traffic having a small variance of the output data transfer rate arrives at the receiving apparatus through the network can be measured.

According to the exemplary embodiment, since the data transfer rate variance measurement apparatus A113 and the data transfer rate variance measurement apparatus B114 are remotely controlled by the data transfer rate variance measurement apparatus C115, even in a case where a plurality of the data transfer rate variance measurement apparatuses are provided, the measurements thereof can be controlled at one site.

In addition, instead of the data transfer rate variance measurement apparatus C115, a human interface of the data transfer rate variance measurement apparatus A113 may be used to directly control the data transfer rate variance measurement apparatus A113 and remotely control the data transfer rate variance measurement apparatus B114, or a human interface of the data transfer rate variance measurement apparatus B114 may be used to directly control the data transfer rate variance measurement apparatus B114 and remotely control the data transfer rate variance measurement apparatus A113, so that it is possible to reduce the number of necessary data transfer rate variance measurement apparatuses.

According to the aforementioned exemplary embodiment of the present invention, the following effects can be obtained.

As a first effect, a data transfer rate variance measurement apparatus is used to measure a variance of an output data transfer rate at a transmitting apparatus for transmitting a real-time audio data or video data, so that it is possible to quantitatively compare and evaluate the variance of the output data transfer rate at the transmitting apparatus for transmitting the real-time audio data or video data.

As a second effect, by using the data transfer rate variance measurement apparatus, it is possible to quantitatively compare and evaluate a degree of the variance of the data transfer rate in a case where a data transmitted out from the transmission apparatus for transmitting the real-time audio data or video data is transmitted via a network.

As a third effect, two or more data transfer rate variance measurement apparatuses are connected to a network, a first data transfer rate variance measurement apparatus transmits a normal traffic to a second data transfer rate variance measurement apparatus by using a traffic generation function, and the second data transfer rate variance measurement apparatus receives the traffic transmitted via the network and measure the data transfer rate variance to calculate a difference thereof, so that it is possible to quantitatively compare and evaluate a degree of the variance of the data transfer rate in case of the traffic passing through the network.

In this manner, according to the exemplary embodiment of the present invention, it is possible to measure a data transfer rate variance (in other words, a degree of constant rate) of a streaming traffic, for example, an output of a server.

By using a result of the measurement, it is possible to perform data transfer at a constant data transfer rate. In addition, the present invention can be applied to a system for measuring a degree of variance of a data transfer rate in case of packets transmitted via a network by using a source having a randomly varying rate.

In the aforementioned exemplary embodiments, the data transfer rate variance measurement apparatus C115 for measurement control is separately provided. However, a measurement control function may be embedded into another apparatus so that an existing network monitoring system or the like can control the measurement.

In addition, in the aforementioned exemplary embodiments, the network 101 and the measurement control network 102 are described as different networks. However, these networks may be the same network.

In addition, the aforementioned exemplary embodiments may be modified by separating a data transfer rate variance measurement analysis function and adding the function to a traffic measurement function of a network apparatus such as an existing router so as to implement additional data transfer rate variance measurement function.

In addition, procedures for implementing a data transfer rate variance measurement system according to the aforementioned exemplary embodiments are stored as a program on a storage medium, and thus, the aforementioned functions according to the exemplary embodiments of the present invention can be executed by a CPU of a computer constituting a system according to the program provided from the storage medium.

The present invention can be applied to even a case where an information group including a program is provided from the storage medium or an external storage medium through a network to an output apparatus.

In other words, program codes read out from the storage medium are an implementation of new functions of the present invention, and the storage medium storing the program codes and signals read out from the storage medium also belong to the scope of the present invention.

As the storage medium, there are used a flexible disk, a hard disk, an optical disk, an optical magnetic disk, a CD-ROM, a CD-R, a CD-RW, a DVD-ROM, a DVD-RAM, a DVD-RW, a DVD+RW, a magnetic tape, a non-volatile memory card, a ROM, and the like.

According to the program of the present invention, the aforementioned functions of the data transfer rate variance measurement system according to the exemplary embodiments of the present invention can be implemented in a computer controlled by the program.

Next, industrial applicability of the aforementioned exemplary embodiments will be described as follows.

According to the exemplary embodiments, the present invention can be applied to a use of collecting data to reduce the variance of the output data transfer rate at the transmitting apparatus for transmitting the real-time audio data or video data by measuring a variance of an output data transfer rate at a transmitting apparatus for transmitting a real-time audio data or video data and quantitatively obtaining the variance of the output data transfer rate at the transmitting apparatus for transmitting the real-time audio data or video data.

In addition, the present invention can be applied to a use of collecting data to determine a reference value for suppressing a degree of the variance of the output data transfer rate at the transmitting apparatus for transmitting the real-time audio data or video data by quantitatively comparing and evaluating a degree of the variance of the data transfer rate in use of a data transfer rate variance measurement apparatus in a case where a data transmitted out from the transmitting apparatus for transmitting the real-time audio data or video data is transmitted via a network.

Finally, the present invention can be applied to a use of measurement of a network service quality by connecting two or more data transfer rate variance measurement apparatuses to a network, allowing a first data transfer rate variance measurement apparatus to transmit a normal traffic of an output data transfer rate to a second data transfer rate variance measurement apparatus by using a traffic generation function, and allowing the second data transfer rate variance measurement apparatus to receive the traffic transmitted via the network, measure the data transfer rate variance, and calculate a difference thereof.

In this manner, a communication quality indicator of packet data communication according to the present invention can be applied to quality measurement of a data transmitting apparatus or quality measurement of a network service as well as traffic quality evaluation.

According to the present invention, it is possible to reduce an amount of calculation for each one packet and a necessary amount of buffer (memory size).

In addition, since a data transfer rate variance indicator is used as a value suitable for traffic quality evaluation, it is possible suitably to measure a data transfer rate variance.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A traffic quality measurement apparatus comprising:
  an interval measurement unit to measure a plurality of packet transfer times t(i) for a plurality of packets;
  a packet length measurement unit to measure a plurality of packet lengths L(i) for the plurality of packets; and,
  an analyzing unit to obtain a variance of a data transfer rate $$DTR(i) \frac{L(i)}{t(i)-t(i-1)}$$

for each packet, where the variance of the data transfer rate is VDTR and is obtained by evaluating:

$$VDTR = \sum_{i=1}^{N} \left( \frac{L(i)}{\sum_{k=1}^{N} L(k)} \times \ln\left( \frac{L(i)}{\sum_{m=1}^{N} L(m)} \frac{\sum_{n=1}^{N} \Delta t(n)}{\Delta t(i)} \right) \right),$$

wherein (N+1) data points are used and are indexed by an index i ranging from 0 to N, and $\Delta t(i)=t(i)-t(i-1)$ is a packet transfer time interval between an (i−1)-th packet and an i-th packet.

2. The apparatus of claim 1, further comprising:
  a packet capture function to capture each packet passing through a line,
  wherein the analyzing unit is to obtain the variance of the data transfer rate by using the packet length and the packet transfer time of each packet captured by the packet capture function.

3. A storage medium storing a computer program that when executed by a computing device causes a method to be performed, the method for measuring a traffic quality, the method comprising:
  measuring a plurality of packet transfer times t(i) for a plurality of packets;
  measuring a plurality of packet lengths L(i) for the plurality of packets; and,
  obtaining a variance of a data transfer rate $$DTR(i) \frac{L(i)}{t(i)-t(i-1)}$$

for each packet, where the variance of the data transfer rate is VDTR and is obtained by evaluating:

$$VDTR = \sum_{i=1}^{N} \left( \frac{L(i)}{\sum_{k=1}^{N} L(k)} \times \ln\left( \frac{L(i)}{\sum_{m=1}^{N} L(m)} \frac{\sum_{n=1}^{N} \Delta t(n)}{\Delta t(i)} \right) \right),$$

wherein (N+1) data points are used and are indexed by an index i ranging from 0 to N, and $\Delta t(i)=t(i)-t(i-1)$ is a packet transfer time interval between an (i−1)-th packet and an i-th packet.

4. The storage medium of claim 1, wherein the method further comprises:
  capturing each packet passing through a line,
  wherein the variance of the data transfer rate is obtained by using the packet length and the packet transfer time of each packet captured.

* * * * *